Aug. 7, 1934.   A. BOUSFIELD   1,968,988
PLATE FULCRUM RAILROAD TRACK SCALE
Filed Aug. 7, 1929   4 Sheets-Sheet 1

INVENTOR
ALFRED BOUSFIELD
BY
/ATTORNEY

Aug. 7, 1934.   A. BOUSFIELD   1,968,988
PLATE FULCRUM RAILROAD TRACK SCALE
Filed Aug. 7, 1929   4 Sheets-Sheet 2

INVENTOR
ALFRED BOUSFIELD
BY
Henry Sherman
ATTORNEY

Aug. 7, 1934.  A. BOUSFIELD  1,968,988
PLATE FULCRUM RAILROAD TRACK SCALE
Filed Aug. 7, 1929   4 Sheets-Sheet 3
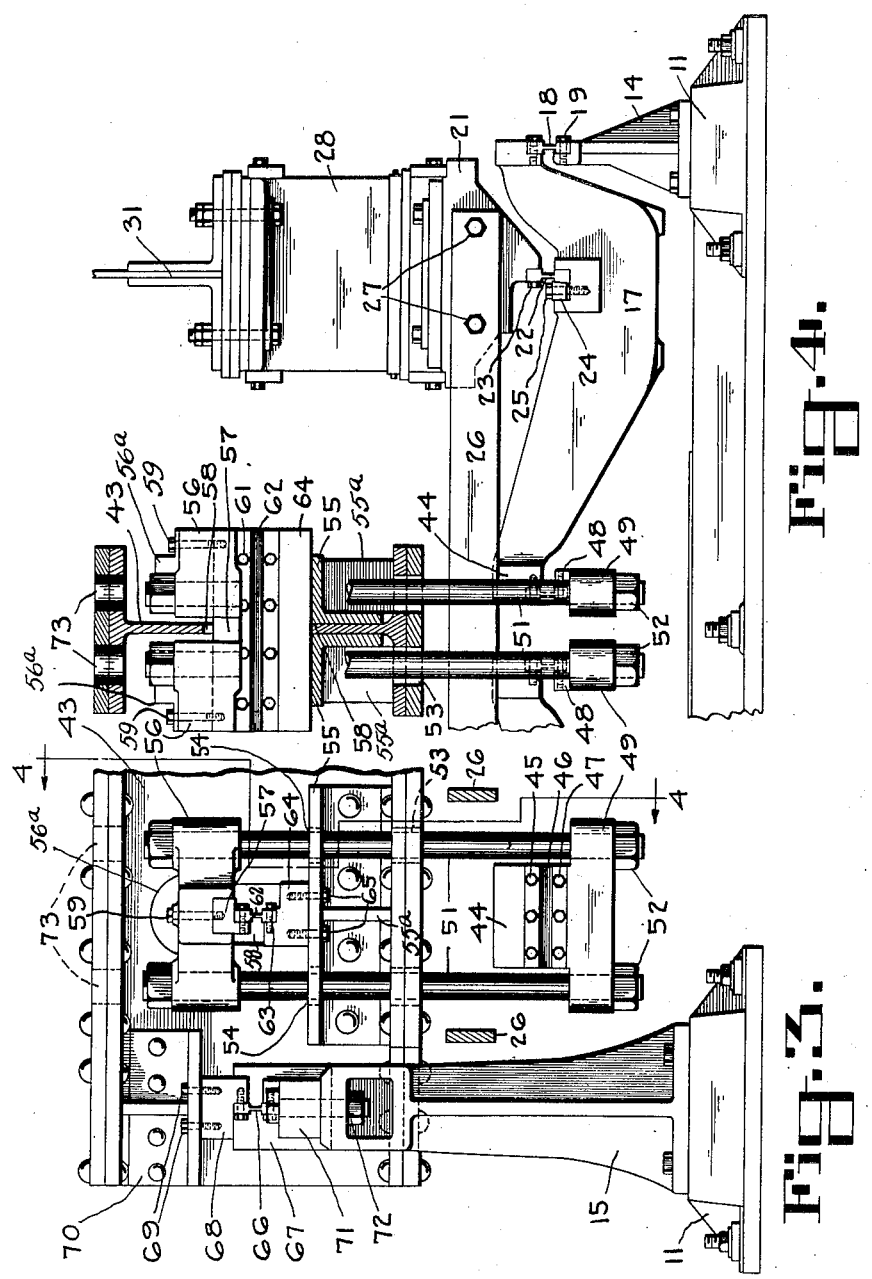
INVENTOR
ALFRED BOUSFIELD
BY
Henry Sherman
ATTORNEY Aug. 7, 1934.  A. BOUSFIELD  1,968,988
PLATE FULCRUM RAILROAD TRACK SCALE
Filed Aug. 7, 1929   4 Sheets-Sheet 4

INVENTOR
ALFRED BOUSFIELD
BY
Henry Thoman
ATTORNEY

Patented Aug. 7, 1934

1,968,988

UNITED STATES PATENT OFFICE 1,968,988

PLATE-FULCRUM RAILROAD TRACK SCALE

Alfred Bousfield, St. Johnsbury, Vt., assignor to E. and T. Fairbanks and Company, St. Johnsbury, Vt., a corporation of Vermont Application August 7, 1929, Serial No. 384,057

20 Claims. (Cl. 265—71)

This invention relates to improvements in weighing scales and more particularly to heavy duty scales in which the load is transmitted from the platform to the levers and from the latter to the weight offsetting means through the medium of plate-fulcrums. While my invention may be incorporated in weighing scales used for many different purposes, it is generally employed in railroad track scales and accordingly I have shown my invention applied to a weighing scale of this kind, it being understood that it is by no means limited to scales of this type.

An important object of this invention is the provision of a scale of the class described characterized by its simplicity of construction, inexpensiveness of manufacture and reliability and accuracy under all conditions of service.

Another object of this invention is the provision of an improved railroad track scale embodying plate-fulcrums for transmitting load stresses through the levers in which greater flexibility is obtained and torsional strains in the scale levers avoided by means of improved connections between the levers.

Another object of the invention is to provide an improved track scale embodying plate-fulcrums for transmitting load stresses and means for supporting the scale levers to assure the maintenance thereof in accurate operative alignment under all conditions.

Another object of this invention is to provide improved means for supporting the approach rails leading to the scale.

Other objects of this invention, together with certain details of construction and combinations of parts, will be described in the specification and pointed out in the appended claims.

In the drawings:—

Figure 3 is a fragmentary side elevational view on an enlarged scale of the suspension means and connections between the longitudinal extension levers and the main levers;

Figure 4 is a cross-sectional view taken substantially on line 4—4 in Figure 3;

Similar characters of reference indicate corresponding parts throughout the several views of the drawings.

Figures 1, 6:
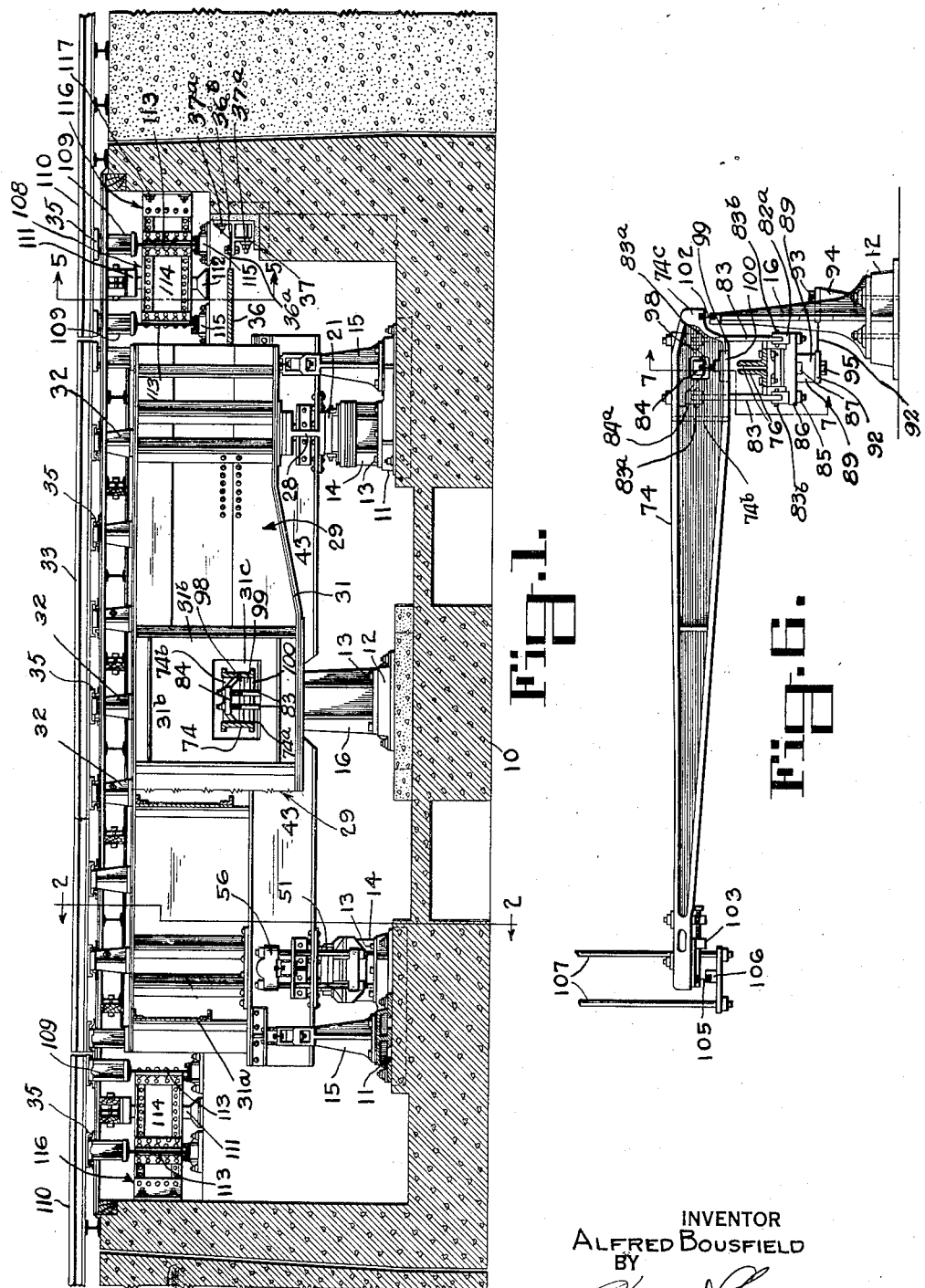
Figure 1 is a longitudinal elevation, partly in section, of the track scale.
Figure 6 is a side elevational view of the transverse extension lever showing the means for preventing sidewise movement of the connection.

In the illustrative embodiment of the invention there is shown the masonry wall of the scale pit generally indicated by the reference numeral 10, to which are suitably bolted the base plates 11 and 12 heavily reinforced so as to transmit the load evenly over the foundation. Each of the base plates 11 has secured thereto, preferably by bolts 13, the fulcrum stands 14 and 15 and to the base plate 12 is securely fastened the fulcrum stand 16.

The fulcrum stands 14 carry the main levers 17, which are fulcrumed thereon by plate-fulcrums, or flexure plates 18, the enlarged rectangular ends of which are firmly held in their seats in the stands and levers by means of cap screws 19. The load is transmited to the main levers 17 from loading blocks 21 through plate-fulcrum or flexure plates 22. One of the enlarged substantially rectangular ends of the plates 22 is secured in its seat in the block 21 by means of cap screws 23 and the other end of the plate is held in its seat in the main lever 17 by a wedge-shaped clamping member 24 retained in position by cap screws 25. The loading blocks 21 are prevented from tipping by being secured to each other by bars 26 fixed to said blocks by cap screws 27.

Suitably mounted on the loading blocks 21 are the girder chairs 28, which support the weighbridge 29, constructed of two fish-belly type girders 31 tied together and braced by any suitable means, such as transverse reinforcing members 31a, examples of which are well-known in the art. Securely bolted to the girders 31 in spaced relation to each other are opposed rail stands 32, to which are fastened the live rails 33. The rail stands 32 carrying the live rails project through the deck 34 of the scale pit and in order to prevent foreign matter, such as rain, dirt and the like, from entering the pit, weather shields 35, examples of which are well-known in the art, are provided.

The girders 31 of the weigh-bridge 29 are checked in the longitudinal direction by means of a relatively long and wide, longitudinally extending flexure plate 36 (Figs. 1 and 5), which is located at one end of the weigh-bridge and is secured at its inner end to the girders 31 by suitable means (not shown), while by providing a wide flexure plate the girders 31 are also checked against lateral movement at that end.

The flexure plate 36 has adjacent to its end a reduced transverse flexible portion 36a, which is adapted to flex under load stresses, the outer end being fixedly secured along its entire transverse edge by a series of bolts 36b fastened to a bracket 37, which is anchored by bolts 37a in the end wall of the scale pit.

The transverse checking of the girders 31 is effected through the medium of laterally extending flexure plates 38, which are located near the opposite end of the weigh-bridge 29 and are provided adjacent to each end with a reduced transverse flexible portion 38a, adapted to flex under load stresses. The flexure plates 38 are pivotally mounted on pins 39 in the brackets 41 and 42, which are rigidly secured to the girders 31 and side walls of the pit, respectively (Figs. 2 and 2a). This latter construction is provided to permit the transverse check plates 38 to turn upon the pins 39 when the weigh-bridge expands or contracts with temperature changes. In the center of each of the girders 31 is located a reinforcing plate 31b, one of which is provided with a rectangular opening 31c, (Fig. 1) for a purpose of which will be subsequently described.

The load is transmitted from the main levers 17 to the longitudinal extension levers 43 and the means for accomplishing the same is shown particularly in Figures 3 and 4. The extension levers themselves are covered by my divisional application, filed May 25, 1931, resulting in Patent No. 1,940,577, Lever for track scales, issued Dec. 19, 1933. As illustrated in Figures 3 and 4, the tip 44 of each main lever has secured thereto by bolts 45 a connecting plate-fulcrum or flexure plate 46, which is fastened by bolts 47 to an upwardly extending, elongated attachment member 48 integral with each one of a pair of spaced lower yokes 49. Each of the lower yokes 49 is slidably and adjustably mounted on the lower extremities of a pair of depending spaced tension rods 51, which are threaded to receive nuts 52, whereby the lower yokes 49 may be moved along the tension rods 51 and adjusted to the proper position to receive equally the load forces transmitted from the main levers 17. The tension rods 51 pass through apertures 53 in the flanges of the longitudinal extension levers 43 and apertures 54 formed in laterally extending shelves 55 formed of angle-irons, which are riveted to the web portion of the levers 43, and are provided with a central supporting plate 55a. The upper extremities of the tension rods 51 are carried by upper yokes 56. A bearing or anchor block 57 extends through an aperture 58 formed in the lever 43 and is mounted in the opposed yokes 56 transversely thereof, being retained in position by cap screws 59. Cap screws 61 secure the upper end of a load carrying plate-fulcrum or flexure plate 62 to the bearing block 57, the flexure plate being at right angles to the flexure plates 46. The lower end of the flexure plate 62 is secured by cap screws 63 to a bearing or anchor block 64, extending through the aperture 58 and parallel to the bearing block 57, the block 64 being rigidly secured by cap screws 65 to the shelves 55, both of which form a support therefor. Each of the upper yokes 56 is provided with an arched portion 56a centrally disposed with relation to the vertical plane of the plate-fulcrum 62 attached to the yokes 56 and providing under stress reinforcement and protection to the plate-fulcrum 62 at the flexing point.

By the construction described it will thus be seen that the load stresses are transmitted in the planes of movement of the main levers 17 and the longitudinal extension levers 43 and substantially in a line coincident with the intersection of the center planes of movement of these levers, thus avoiding torsional strains and making for greater flexibility in the movement of the levers.

Each of the longitudinal extension levers 43 is fulcrumed on the stand 15 (Figs. 3 and 4) by means of a plate-fulcrum or flexure plate 66, which extends transversely through an aperture 67 formed in the butt end of the lever, the upper extremity of the plate being bolted to a bearing or anchor block 68 rigidly secured by cap screws 69 to a pair of angle plates or shelves 70 riveted to opposite faces of the lever and the lower end being attached to an anchor block 71 preferably bolted to the stand 15 by bolts 72. Apertures 73 are formed in the upper flanges of the lever 43 to aid in the assembly of the scale parts.

Figure 2:
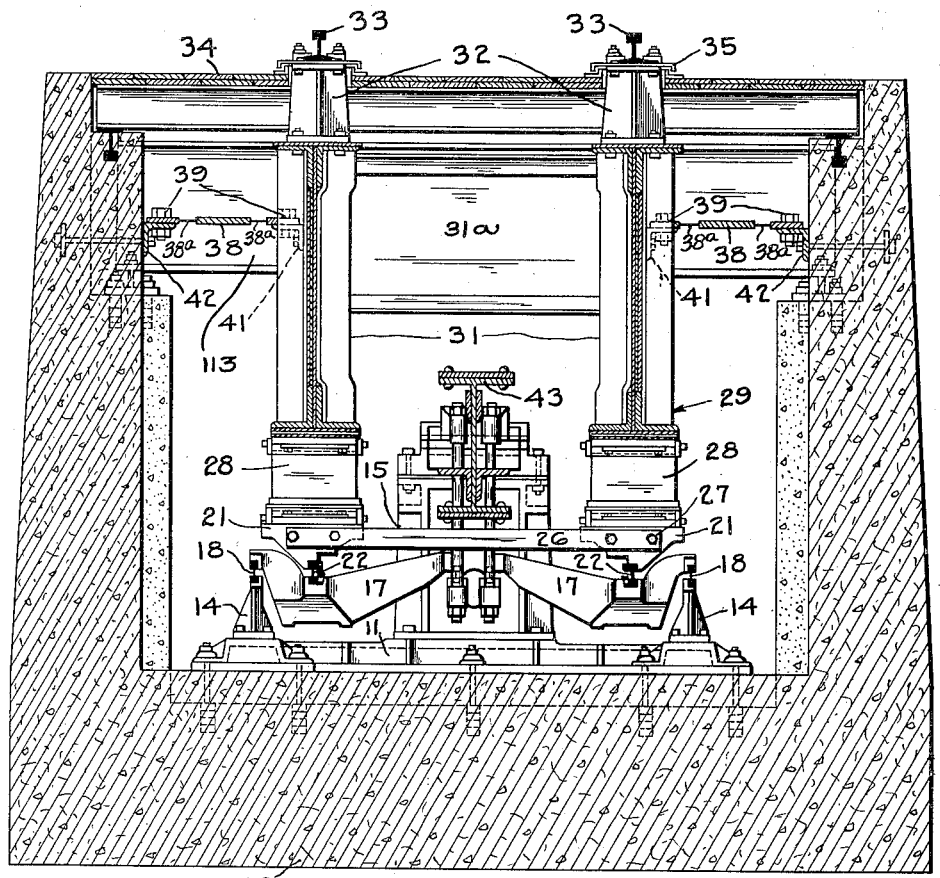
Figure 2 is a cross-sectional view taken on line 2—2 in Figure 1 showing the connection between the longitudinal transverse levers and the main levers.
Figure 2A:
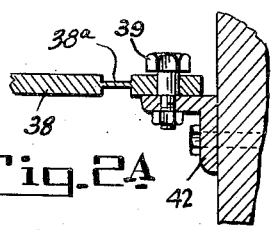
Figure 2A is an elevational view showing the pivotal connection of the lateral flexure plates to the weighbridge and side walls of the pit.
Figure 7:
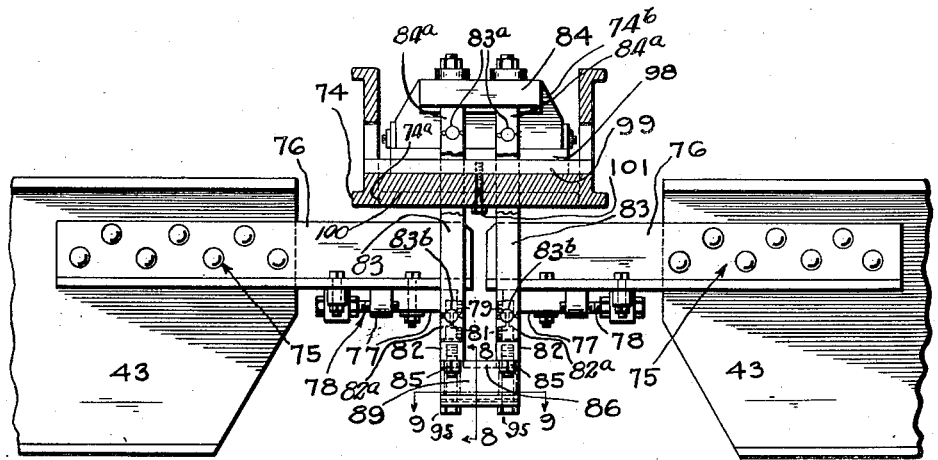
Figure 7 is an elevational view taken on line 7—7 in Figure 6 showing the connection between the transverse and the longitudinal extension levers.
Figure 9:
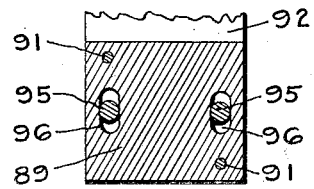
Figure 9 is a detail sectional view taken on line 9—9 in Figure 7.

The load stresses are transmitted from the longitudinal extension levers 43 to the transverse extension lever 74 by a lever suspension arrangement shown particularly in Figures 1, 6 and 7. To the tips of the longitudinal extension levers 43 are bolted by bolts 75, angle-irons 76, (Fig. 7) upon which are supported the nose-irons 77 mounted for longitudinal adjustment at 78, the construction of which is fully described in my co-pending divisional application Ser. No. 523,805, Adjustable nose irons for track scales, filed March 19, 1931. The nose irons 77 have fixed thereto, by means of bolts 79, opposed fulcrum-plates 81, which are fastened to spaced lower bearing blocks 82 supported by means of spaced tension rods 83 from an upper bearing block 84 transversely mounted on the transverse lever 74. These tension rods 83 extend through an opening 74a (Figs. 1 and 7) in the butt end of the transverse lever 74 and are pivotally connected to the upper bearing block 84 and lower bearing blocks 82 by means of pivot pins 83a and 83b inserted through the ends of the tension rods 83 and upper and lower U-shaped mounting blocks 84a and 82a secured respectively to the upper and lower bearing blocks, whereby the pivoted tension rods 83 are permitted to automatically yield under stress. Cross-webs 74b and 74c enclose the upper and lower ends of the opening 74a and serve to reinforce the lever at those points. Thus by employing the pivotal mounting of the tension rods 83 as described torsional strains are avoided and the plate-fulcrums 81 are protected from injury. Further, by this particular arrangement, which constitutes an important and desirable feature of the invention, the nose irons 77 in their downward pull cooperate with the bearing block 84 on the transverse lever 74 through the medium of the depending rods 83, so that the nose irons operatively move with the transverse lever in the direction of the load instead of pulling away from the load as is generally the case in other track scales in the art employing plate-fulcrum nose iron connections.

Figure 8:
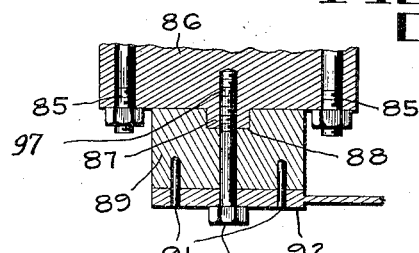
Figure 8 is a detail sectional view taken on line 8—8 in Figure 7.

Attached to the bearing blocks 82 preferably by bolts 85 is a platen member 86 having integral therewith a projection 87 extending longitudinally of the platen 86 and substantially rectangular in cross-section, as is shown in Figure 8. The projection is adapted to fit and be movable within a groove 88 formed in the upper surface of a stay plate holding member 89, to which is attached by pins 91, one end of a flexure stay plate 92. The other end of the stay plate is secured by bolts 93 to a bracket 94 fixed in any suitable manner to the fulcrum stand 16. Cap screws 95 pass through elongated holes or slots 96 formed in the stay plate 92 and holding member 89 and enter screw-threaded holes 97 in the projection 87. To the transversely mounted upper bearing block 84 (Figs. 1 and 6) is fixed by any suitable means the upper extremity of a plate-fulcrum or load flexure plate 98, the lower extremity of which is attached to a transversely disposed bearing block 99 (Fig. 7) secured to a cross-bar 100, extending across the opening 74a in the transverse extension lever 74, preferably by cap screws 101, the plate-fulcrum 98 being thereby transversely mounted on the transverse extension lever 74. The construction above outlined enables the fulcrum-plates 81 and 98 to be maintained in their vertical position should it ever be necessary to move the longitudinal extension lever nose irons 77. To allow this adjustment, the cap screws 95 are loosened, the platen member 86 is moved relative to the holding member 89, which is held in position by the stay plate 92, and then the screws are tightened again, thus retaining the parts in adjusted position. It will be understood that by the projection and groove construction of the platen 86 and holding member 89 the cap screws 95 will be relieved of any thrust which may be set up and a construction of greater durability is obtained. The stay plate construction permits of vertical motion to the connection between the longitudinal extension levers 43 and the transverse extension lever 74 but prevents any motion in a horizontal plane.

The transverse extension lever 74 is fulcrumed on the stand 16 by means of a plate-fulcrum or flexure plate 102 suitably connected to the stand and the butt end of the lever.

Suitable connections between the tip end of the transverse extension lever 74 and the steelyard and weight-offsetting means are provided. As shown in Figure 6, the connecting means includes a nose iron 103 adjustably mounted on the under surface of the lever 74 and a plate-fulcrum or flexure plate 105 fixed to the nose iron transversely thereof and to a block 106 carried by the beam rods 107, which are connected to the beam outfit (not shown) as is well understood in the art. The transverse extension lever 74 extends outwardly from the suspension bearings of the nose-irons 77 of the longitudinal extension levers 43, through the rectangular opening 31c in the reinforcing plate 31b, in which it moves, and is connected to the beam rods 107, as previously described and shown in Figures 1 and 6.

Figure 5:
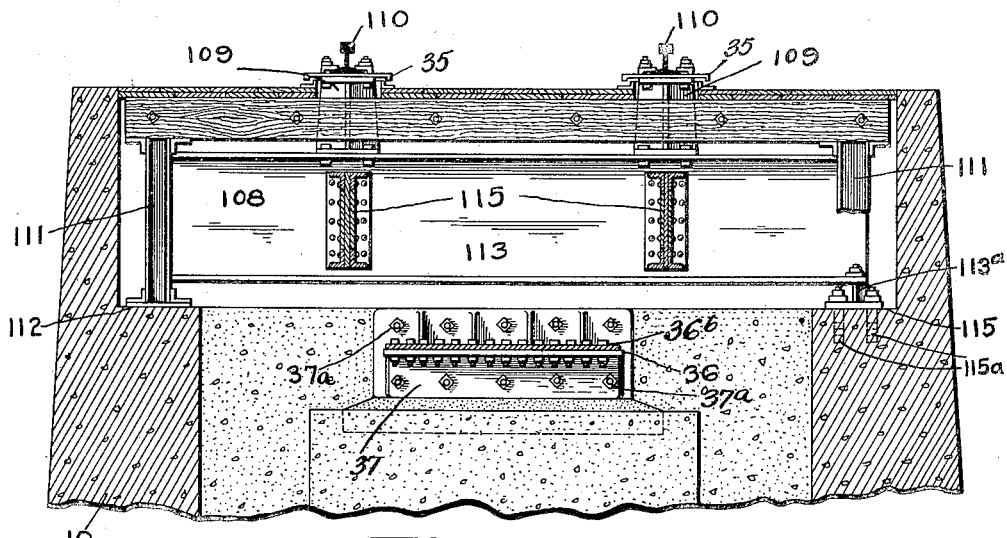
Figure 5 is a cross-sectional view taken on line 5—5 in Figure 1, showing the approach rail and deck support construction.

For the purpose of facilitating the installation and inspection of the scale, the weighbridge 29 is spaced from the end walls of the scale pit and to bridge these spaces an approach construction is provided, as is shown in Figures 1 and 5. This approach construction includes a diaphragm generally indicated by the reference numeral 108, which supports the rail stands 109 carrying the approach rails 110 and pedestals 111, which sustain the scale deck independent of the approach rails 110 and are mounted on pedestal supports 112 attached to the wall of the pit. The diaphragm 108 comprises the transverse I-beams 113 and is reinforced by a plate and channel-iron construction 114, which is preferably riveted to the I-beams intermediate their ends. The I-beams 113 are secured by bolts 113a to beam supports 115, which are securely fastened to the wall of the pit by expansion bolts 115a. The diaphragm 108 is rigidly anchored to the end wall of the scale pit by a bracket member generally indicated by the reference numeral 116 and secured by bolts 117.

It will be understood that the suspension of the main levers 17 below the longitudinal extension levers 43 makes for greater constancy in scale performance and lessens the opportunities for inaccuracies to work in.

Having thus described my invention, what I claim as new and desire to secure by Letters Patent of the United States is:

1. In a scale of the class described, the combination with complementary main levers, of an extension lever adapted to be operated thereby, and means for suspending the said main levers from the said extension lever including a load carrying plate-fulcrum transversely mounted in the said extension lever, and suspension means comprising opposed upper yokes having spaced vertical openings therein and attached to the said plate-fulcrum, spaced tension rods fixedly mounted in the said openings and suspended from the said upper yoke on each side of the extension lever, and lower yokes likewise provided with spaced vertical openings in which the lower ends of the tension rods are adjustably mounted, and upstanding elongated members integral with the said lower yokes to which the lower plate-fulcrums are attached and disposed at right angles to the upper plate-fulcrum, the lower plate-fulcrums being also attached to the tips of the main levers.

2. In a scale of the class described, the combination with complementary main levers, of an extension lever adapted to be operated thereby, and means for transmitting load stresses from the said main levers to the said extension lever, including a transverse plate-fulcrum mounted in the extension lever, a plurality of suspension rods suspended from the said plate-fulcrum and having adjustable means mounted on the said suspension rods and fulcrumed by a plate-fulcrum to the main levers.

3. In a device of the class described, the combination with complementary main levers, of longitudinal extension levers adapted to be operated thereby, a transverse extension lever, means for transmitting load stresses from the said longitudinal levers to the said transverse lever, including an upper bearing block resiliently mounted in an opening in the butt end of the said transverse lever, and tension rods depending through the said opening from the said upper bearing block and carrying spaced lower bearing blocks, the said tension rods being pivotally connected to the upper and lower bearing blocks and adapted to yield under stress transversely of the transverse lever, and plate-fulcrums carried by the upper and lower bearing blocks, the lower plate-fulcrums being thus operatively connected to the said longitudinal extension levers, whereby the lower plate-fulcrums are pivotally suspended from the upper plate-fulcrum.

4. In a device of the class described, the combination with complementary main levers, of longitudinal extension levers adapted to be operated thereby, a transverse extension lever, means for transmitting load stresses from the said longitudinal levers to the said transverse lever, including an upper bearing block mounted in an opening in the butt end of the said transverse lever, and tension rods depending through the said opening from the said upper bearing block and carrying spaced, lower bearing blocks, the said tension rods being pivotally connected to the upper and lower bearing blocks, a plate-fulcrum mounted in each of the said upper and lower bearing blocks, and an adjustable member attached to the end of each longitudinal extension lever and having fixed thereto the plate-fulcrum supported by each of the lower bearing blocks.

5. In a device of the class described, the combination with complementary main levers, of longitudinal extension levers adapted to be operated thereby, a transverse extension lever, means for transmitting load stresses from the said longitudinal levers to the said transverse lever, including an upper bearing block mounted in the said transverse lever and tension rods depending from the said upper bearing block and carrying spaced, lower bearing blocks, plate-fulcrum lever connections carried by each upper and lower bearing block, the said tension rods being pivotally mounted on the said upper and lower bearing blocks, and means attached to the said lower bearing blocks, for checking movement of the said plate-fulcrum connections in a horizontal plane.

6. In a device of the class described, the combination with complementary main levers, of longitudinal extension levers adapted to be operated thereby, a transverse extension lever, means for transmitting load stresses from the said longitudinal levers to the said transverse lever, including an upper bearing block mounted in the said transverse lever, and tension rods depending from the said upper bearing block and carrying spaced, lower bearing blocks, plate-fulcrum lever connections carried by each upper and lower bearing block, the said tension rods being pivotally mounted on the said upper and lower bearing blocks, and adjustable means attached to the said lower bearing blocks, for checking the movement of the said plate-fulcrum connections in a horizontal plane.

7. In a device of the class described, the combination with complementary main levers, of longitudinal extension levers adapted to be operated thereby, a transverse extension lever, means for transmitting load stresses from the said longitudinal levers to the said transverse lever, including an upper bearing block mounted in the said transverse lever, and tension rods depending from the said upper bearing block and carrying spaced, lower bearing blocks, the said tension rods being pivotally connected to the upper and lower bearing blocks and mounted transversely of the transverse lever, and a plate-fulcrum mounted in each of the said upper and lower bearing blocks, the lower plate-fulcrum being disposed at right angles to the upper plate-fulcrum.

8. In a device of the class described, the combination with main levers, extension levers and a transverse lever, of plate-fulcrum connections between the said main, extension and transverse levers, and means for checking the said plate-fulcrum connections between the extension and transverse levers, including a platen member and a stay-plate adapted to be movable relative to each other.

9. In a device of the class described, the combination with main levers, extension levers and a transverse lever, of plate-fulcrum connections between the said main, extension and transverse levers, and means for checking the said transverse lever plate-fulcrum connections, including a platen member carried by said connections and a stay-plate fixed against movement in a horizontal plane, the said platen member being adjustable relative to the said stay-plate.

10. In a device of the class described, the combination with main levers, extension levers and a transverse lever, of plate-fulcrum connections between the said main, extension and transverse levers, and means for checking the said transverse lever plate-fulcrum connections, including a platen member carried by said connections and a fixedly mounted stay-plate adapted to be restrained against movement in a horizontal plane, the said platen member being adjustable relative to the said stay-plate.

11. In a device of the class described, the combination with main levers, extension levers and a transverse lever, and fulcrum stands for the said levers, of plate-fulcrum connections between the said main, extension and transverse levers, and means for checking the said plate-fulcrum transverse lever connections, including a platen member having a projection thereon carried by the said connections and a flexible stay-plate fixed to one of the said fulcrum stands, the said stay-plate having means thereon adapted to co-operate with the said projection.

12. In a device of the class described, the combination with main levers, extension levers and a transverse lever, and fulcrum stands for the said levers, of plate-fulcrum connections between the said main, extension and transverse levers, and means for checking the said plate-fulcrum transverse lever connections, including a platen member having a projection thereon carried by the said connections, a holding member having a groove therein adapted to co-operate with the said projection, a stay-plate attached to the said holding member, the said holding member and stay-plate having slots therein and bolts extending through the slots and into the said projection for adjustably retaining the holding member against the said platen member.

13. In a device of the class described, the combination with main levers, extension levers and a transverse lever, of plate-fulcrum connections between the said extension levers and transverse lever, and means for checking the plate-fulcrum connections between the extension and transverse levers, including a platen member and a stay-plate adapted to be movable relative to each other, and means for securing the stay-plate in a fixed position.

14. In a device of the class described, the combination with main levers, extension levers and a transverse lever, of plate-fulcrum connections between the said extension levers and transverse lever, and means for checking the plate-fulcrum connections between the extension and transverse levers, including a platen member carried by the said connections and a stay-plate held against movement in a horizontal plane, the said platen member being adjustable relative to the said stay-plate.

15. In a device of the class described, the combination with main levers, extension levers and a transverse lever, and fulcrum stands for the said levers, of plate-fulcrum connections between the said extension levers and transverse lever, and means for checking the plate-fulcrum connections between the extension and transverse levers, including a platen member carried by the said connections and a flexible stay-plate having one end fixed to one of the said fulcrum stands and the other end adjustably secured to the stay-plate, whereby the platen member may be adjusted longitudinally.

16. In a device of the class described, the combination with main levers, extension levers and a transverse lever, and fulcrum stands for the said levers, of plate-fulcrum connections between the said extension levers and transverse lever, and means for checking the plate-fulcrum connections between the extension and transverse levers, including a platen member having a projection thereon carried by the said connections, and a flexible stay-plate fixed to one of the said fulcrum stands, the said stay-plate having means thereon adapted to co-operate with the said projection.

17. In a device of the class described, the combination with main levers, extension levers and a transverse lever, and fulcrum stand for the said levers, of plate-fulcrum connections between the said extension levers and transverse lever, and means for checking the plate-fulcrum connections between the extension and transverse levers, including a platen member having a projection thereon carried by the said connections, a holding member having a groove therein adapted to co-operate with the said projection, and a stay-plate attached to the said holding member, the said holding member and stay-plate having slots therein and bolts extending through the said slots and into the projection for adjustably retaining the said holding member in position against the platen member.

18. In a device of the class described, the combination with complementary main levers, of longitudinal extension levers adapted to be operated thereby, a transverse extension lever, and means for transmitting load stresses from the said longitudinal levers to the said transverse lever, including an upper bearing block mounted on the said transverse lever, and tension rods depending from the said upper bearing block and carrying spaced lower bearing blocks, the said tension rods being pivotally mounted on the said upper and lower bearing blocks transversely of the transverse lever, a platen member supporting the lower bearing blocks and carrying a stay-plate holding member, and a stay-plate attached to the said stay-plate holding member.

19. In a device of the class described, the combination with complementary main levers, of longitudinal extension levers adapted to be operated thereby, a transverse extension lever, and means for transmitting load stresses from the said longitudinal levers to the said transverse lever, including an upper bearing block mounted on the said transverse lever, and tension rods depending from the said upper bearing block and carrying spaced lower bearing blocks, the said tension rods being pivotally mounted on the said upper and lower bearing blocks and transversely of the transverse lever, a platen member supporting the lower bearing blocks and carrying a stay-plate holding member, and an adjustable stay-plate detachably mounted on the said stay-plate holding member.

20. In a device of the class described, the combination with complementary main levers, of longitudinal extension levers adapted to be operated thereby, a transverse extension lever, and means for transmitting load stresses from the said longitudinal levers to the said transverse lever, including an upper bearing block mounted on the said transverse lever, and tension rods depending from the said upper bearing block and carrying spaced lower bearing blocks, the said tension rods being pivotally mounted on the said upper and lower bearing blocks and transversely of the transverse levers, a platen member supporting the lower bearing blocks and carrying a stay-plate holding member, and an adjustable stay-plate detachably mounted on the said stay-plate holding member and having its free end fixed.

ALFRED BOUSFIELD.